(12) United States Patent
Thantharate et al.

(10) Patent No.: US 11,558,920 B2
(45) Date of Patent: Jan. 17, 2023

(54) WIRELESS USER EQUIPMENT (UE) CONTROL OVER WIRELESS NETWORK SLICES BASED ON SLICE REQUIREMENTS

(71) Applicant: T-Mobile Innovations LLC, Overland Park, KS (US)

(72) Inventors: Anurag Thantharate, Kansas City, MO (US); Sreekar Marupaduga, Overland Park, KS (US); Kavitha Swaminathan, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 93 days.

(21) Appl. No.: 17/230,744

(22) Filed: Apr. 14, 2021

(65) Prior Publication Data
US 2022/0338296 A1    Oct. 20, 2022

(51) Int. Cl.
*H04W 4/00*     (2018.01)
*H04W 76/27*    (2018.01)
*H04W 8/02*     (2009.01)
*H04W 48/18*    (2009.01)

(52) U.S. Cl.
CPC .......... *H04W 76/27* (2018.02); *H04W 8/02* (2013.01); *H04W 48/18* (2013.01)

(58) Field of Classification Search
CPC ....... H04W 76/27; H04W 8/02; H04W 48/18; H04W 8/04; H04W 8/06; H04W 48/16; H04W 48/17
USPC ......................................................... 370/328
See application file for complete search history.

(56) References Cited

U.S. PATENT DOCUMENTS

| | | | |
|---|---|---|---|
| 2019/0098537 A1* | 3/2019 | Qiao | .................... H04W 36/10 |
| 2019/0150219 A1 | 5/2019 | Wang et al. | |
| 2019/0173740 A1 | 6/2019 | Zhang et al. | |
| 2019/0174449 A1 | 6/2019 | Shan et al. | |
| 2019/0387440 A1 | 12/2019 | Yiu et al. | |
| 2020/0008047 A1 | 1/2020 | Castellanos Zamora et al. | |
| 2020/0092758 A1 | 3/2020 | Youn et al. | |

(Continued)

OTHER PUBLICATIONS

"3rd Generation Partnership Project; Technical Specification Group Services and System Aspects; Study on the security of Access and Mobility Management Function (AMF) re-allocation; (Release 17)"; 3GPP; Jan. 2021; pp. 1-38; TR 33.864 V0.3.0; 3GPP; Sophia Antipolis, France.

(Continued)

*Primary Examiner* — Huy C Ho

(57) ABSTRACT

A wireless User Equipment (UE) controls a wireless network slice type that has slice requirements. In the UE, source Radio Resource Control (RRC) circuitry exchanges source signaling with a source Access and Mobility Management Function (AMF). During the exchange of the source signaling, target RRC circuitry exchanges target signaling with target AMFs and determines AMF characteristics. The target RRC circuitry compares the AMF characteristics to the slice requirements and selects one of the target AMFs based on the comparison. The source or target RRC circuitry exchange additional target signaling with the selected one of the target AMFs to use the wireless network slice type. User-plane circuitry exchanges user data with the wireless network slice which is controlled by the selected target AMF.

20 Claims, 9 Drawing Sheets

(56) References Cited

U.S. PATENT DOCUMENTS

2020/0322857 A1* 10/2020 Park .................. H04W 76/34
2022/0141751 A1*  5/2022 Yao ................... H04W 40/36
                                                    370/331

OTHER PUBLICATIONS

Huawei, et al.; "Proposed corrections to 38.300 mainly on RRC_INACTIVE state"; 3GPP; Aug. 2017; 13 pages; 3GPP TSG-RAN WG2#99; 3GPP; Sophia Antipolis, France.
Nokia, et al.; "Remaining clarifications on Slice Assistance Information with TP"; 3GPP; Apr. 2018; 7 pages; 3GPP TSG-RAN WG2 Meeting #101 bis; 3GPP; Sophia Antipolis, France.
Samsung, et al.; AMF selection to solve the UE stickiness problem': 3GPP; Jan. 2017; pp. 1-4; 3GPP; SA WG2 Meeting #118bis; 3GPP; Sophia Antipolis, France.

* cited by examiner

WIRELESS USER EQUIPMENT (UE) CONTROL OVER WIRELESS NETWORK SLICES BASED ON SLICE REQUIREMENTS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications to support and use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), User Plane Functions (UPFs), and the like. The wireless access nodes are coupled to the wireless network cores over backhaul links.

A wireless network slice comprises a set of network elements like an SMF/UPF combination or just a UPF. The wireless user devices may request a specific type of wireless network slice like a low-latency slice or a machine-communication slice. The AMFs interact with other network elements to authorize the wireless user devices to use the wireless network slices. In some cases, the AMFs perform AMF reselection to other AMFs due to overloads or user mobility. Unfortunately, the wireless user devices do not effectively control their wireless network slices. Moreover, the wireless user devices do not efficiently optimize the AMFs that control their wireless network slices.

TECHNICAL OVERVIEW

A wireless User Equipment (UE) controls a wireless network slice type that has slice requirements. In the UE, source Radio Resource Control (RRC) circuitry exchanges source signaling with a source Access and Mobility Management Function (AMF). During the exchange of the source signaling, target RRC circuitry exchanges target signaling with target AMFs and determines AMF characteristics. The target RRC circuitry compares the AMF characteristics to the slice requirements and selects one of the target AMFs based on the comparison. The source or target RRC circuitry exchange additional target signaling with the selected one of the target AMFs to use the wireless network slice type. User-plane circuitry exchanges user data with the wireless network slice which is controlled by the selected target AMF.

DETAILED DESCRIPTION

Figure 1:
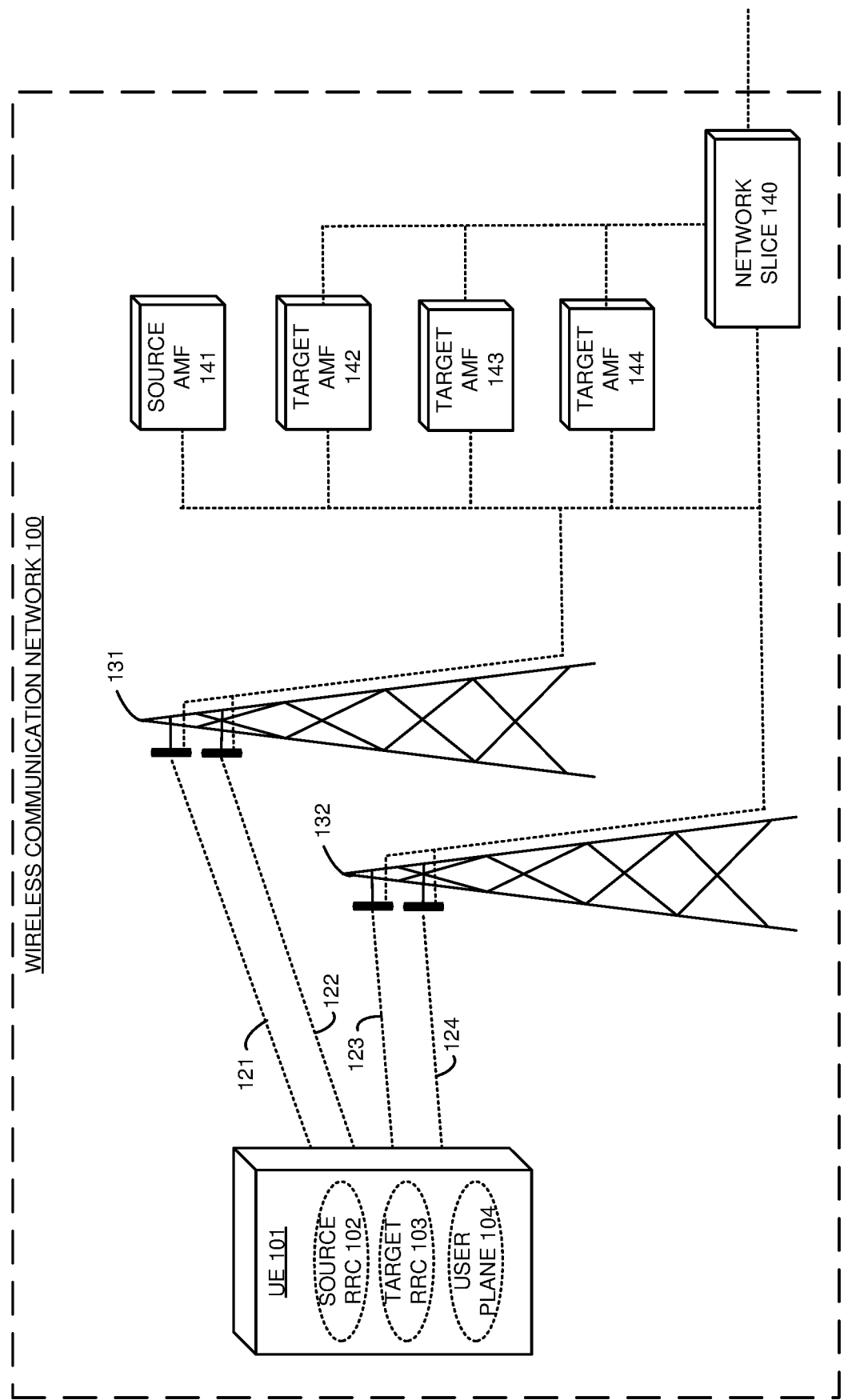
FIG. 1 illustrates a wireless communication network that comprises a wireless User Equipment (UE) that controls a wireless network slice based on slice requirements.

FIG. 1 illustrates wireless communication network 100 that comprises wireless User Equipment (UE) 101 that controls wireless network slice 140 which has slice requirements. Wireless communication network 100 comprises User Equipment (UE) 101, wireless access nodes 131-132, source Access and Mobility Management Function (AMF) 141, target AMFs 142-144, and wireless network slice 140. UE 101 comprises source Radio Resource Control (RRC) circuitry 102, target RRC circuitry 103 and user-plane circuitry 104. Wireless communication network 100 delivers services to UE 101 like internet-access, machine-control, media-streaming, or some other data communications product. UE 101 comprises a computer, phone, vehicle, sensor, robot, or some other data appliance with wireless communication circuitry.

Various examples of network operation and configuration are described herein. In some examples, source RRC circuitry 102 exchanges source signaling with source Access and Mobility Management Function (AMF) 141 over one of frequency bands 121-124 and wireless access nodes 131-132. During this exchange of source signaling, target RRC circuitry 103 exchanges target signaling with target AMFs 142-144 over at least some of frequency bands 121-124 and wireless access nodes 131-132. Target RRC circuitry 103 determines AMF characteristics for target AMFs 142-144 responsive to the target network signaling. The exchange of the target signaling to determine the AMF characteristics may be responsive to the source signaling exchange between source RRC circuitry 102 and source AMF 141. Target RRC circuitry 103 compares the AMF characteristics to the slice requirements for the slice type of wireless network slice 140. Target RRC circuitry 103 selects one of target AMFs 142-144 based on the comparison of the AMF characteristics to the slice requirements. This AMF comparison and selection may be responsive to a loss of received signal strength at UE 101. In some examples, target RRC circuitry 103 exchanges additional signaling with the selected one of target AMFs 142-144 to use the wireless network slice type. In other examples, target RRC circuitry 103 exchanges signaling with source RRC circuitry 102, and source RRC circuitry 102 exchanges the additional signaling with the selected one of target AMFs 142-144 to use the wireless network slice type. User-plane circuitry 104 exchanges user data with wireless network slice 140 over at least one of frequency bands 121-124 and wireless access nodes 131-132. Wireless network slice 140 is controlled by the selected one of target AMFs 142-144.

In some examples, source AMF 141 authenticates wireless UE 101 during the exchange of the source signaling. AMF 141 transfers authentication tokens for UE 101 to source RRC circuitry 102. Target RRC circuitry 103 transfers the authentication tokens to target AMFs 142-144. AMFs 142-144 authenticate UE 101 based on the authentication tokens to avoid full UE re-authentication. Advantageously, UE 101 effectively controls wireless network slice 140. Moreover, UE 101 efficiently optimizes AMFs 142-144 that control wireless network slice 140.

RRC circuitry 102-103 in UE 101 and AMFs 141-144 communicate over frequency bands 121-124 and wireless access nodes 131-132. Different pairs of RRC circuitry 102-103 and AMFs 141-144 may use different frequency bands, radios, and wireless access nodes. Different pairs of RRC circuitry 102-103 and AMFs 141-144 may use the same frequency bands, radios, and wireless access nodes. UE 101 and wireless access nodes 131-132 communicate over Radio Access Technologies (RATs) like Fifth Generation New Radio (5GNR), Long Term Evolution (LTE), Institute of Electrical and Electronic Engineers (IEEE) 802.11 (WIFI), Bluetooth, or some other wireless protocol. The RATs use electromagnetic frequencies in the low-band, mid-band, high-band, or some other portion of the electromagnetic spectrum. The communication links between wireless access nodes 131-132, wireless network slice 140, and AMFs 141-144 and use metallic links, glass fibers, radio channels, or some other communication media. The communication links use Ethernet, IP, Time Division Multiplex (TDM), Data Over Cable System Interface Specification (DOCSIS), General Packet Radio Service Transfer Protocol (GTP), 5GNR, LTE, WIFI, virtual switching, inter-processor communication, bus interfaces, and/or some other data communication protocols. UE 101 and wireless access nodes 131-132 comprise antennas, amplifiers, filters, modulation, analog/digital interfaces, microprocessors, software, memories, transceivers, bus circuitry, and the like. Wireless network slice 140 and AMFs 141-144 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
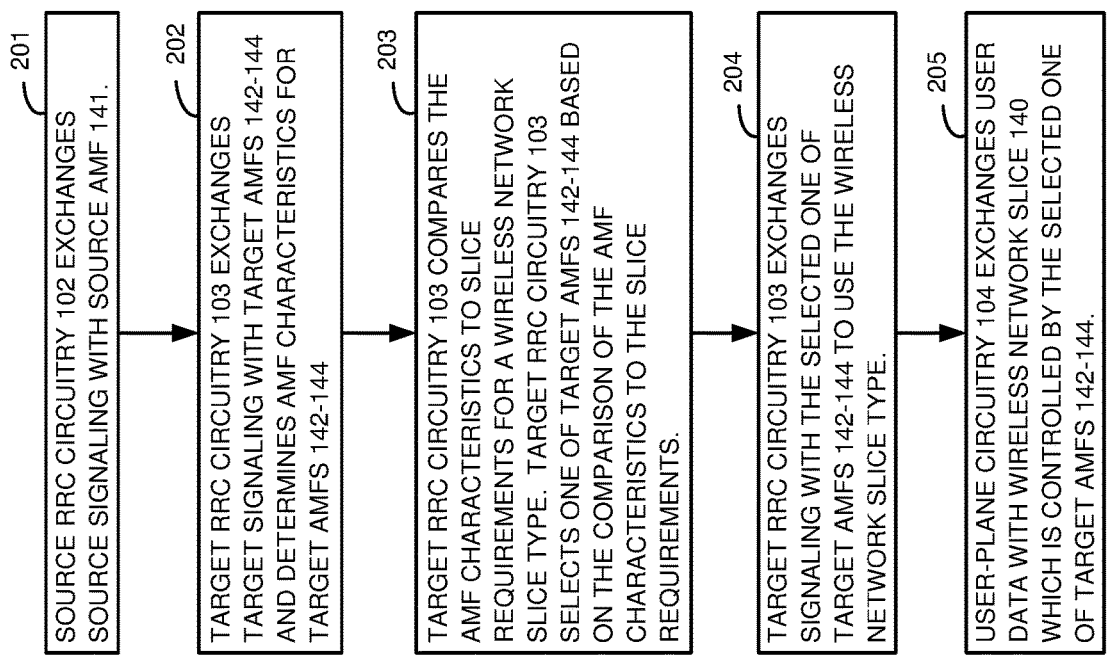
FIG. 2 illustrates an exemplary operation of the wireless communication network that comprises the wireless UE that controls the wireless network slice based on the slice requirements.

FIG. 2 illustrates an exemplary operation of wireless communication network 100 that comprises wireless UE 101 that controls wireless network slice 140 which has the slice requirements. The operation may differ in other examples. Source RRC circuitry 102 exchanges source signaling with source AMF 141 (201). In response to the exchange of source signaling, target RRC circuitry 103 exchanges target signaling with target AMFs 142-144 (202). For example, source RRC circuitry 102 and source AMF 102 may identify the slice type for slice 140, and target RRC circuitry 103 and target AMFs 142-144 may then identify the best AMF for the slice type. Target RRC circuitry 103 determines AMF characteristics for target AMFs 142-144 responsive to the target network signaling (202). Target RRC circuitry 103 compares the AMF characteristics to slice requirements for the slice type of wireless network slice 140 (203). Target RRC circuitry 103 selects one of target AMFs 142-144 based on the comparison of the AMF characteristics to the slice requirements (203). In this example, target RRC circuitry 103 exchanges additional signaling with the selected one of target AMFs 142-144 to use the slice type of wireless network slice type (204). User-plane circuitry 104 exchanges user data with wireless network slice 140 which is controlled by the selected one of target AMFs 142-144 (205).

Figure 3:
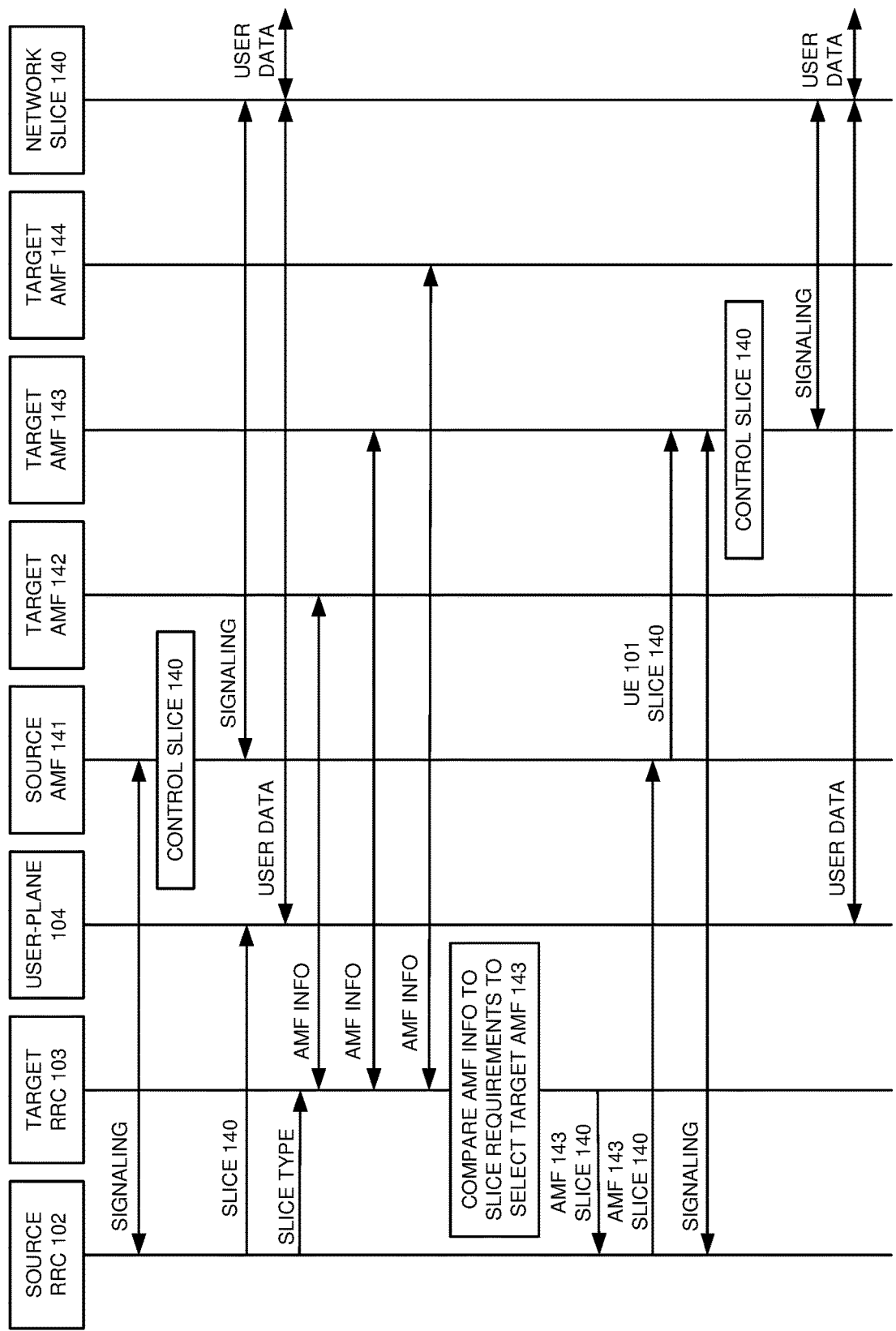
FIG. 3 illustrates an exemplary operation of the wireless communication network that comprises the wireless UE that controls the wireless network slice based on the slice requirements.

FIG. 3 illustrates an exemplary operation of wireless communication network 100 that comprises wireless UE 101 that controls wireless network slice 140 based on the slice requirements. The operation may differ in other examples. Source RRC circuitry 102 exchanges signaling with source AMF 141. In response, AMF 141 controls wireless network slice 140 through the exchange of signaling. Source RRC circuitry 102 indicates wireless network slice 140 to user-plane circuitry 104. User-plane circuitry 104 exchanges user data with external systems over wireless network slice 140. In response to the use of wireless network slice 140, source RRC circuitry 102 indicates the slice type for wireless network slice 140 to target RRC circuitry 103. In response, target RRC circuitry 103 exchanges signaling with target AMFs 142-144 to obtain AMF info. Target RRC circuitry 103 determines AMF characteristics for target AMFs 142-144 base on the AMF info. Target RRC circuitry 103 compares the AMF characteristics to the slice requirements for the slice type of wireless network slice 140. Target RRC circuitry 103 selects target AMF 143 (in this example) based on the comparison of the AMF characteristics to the slice requirements. Target RRC circuitry 103 indicates target AMF 143 and network slice 140 to source AMF 141. Source AMF 141 indicates UE 101 and target AMF 143 to AMF 143. In response, AMF 143 controls wireless network slice 140 through the exchange of signaling. Source RRC circuitry 102 and target AMF 143 exchange signaling. User-plane circuitry 104 exchanges user data with external systems over wireless network slice 140.

Figure 4:
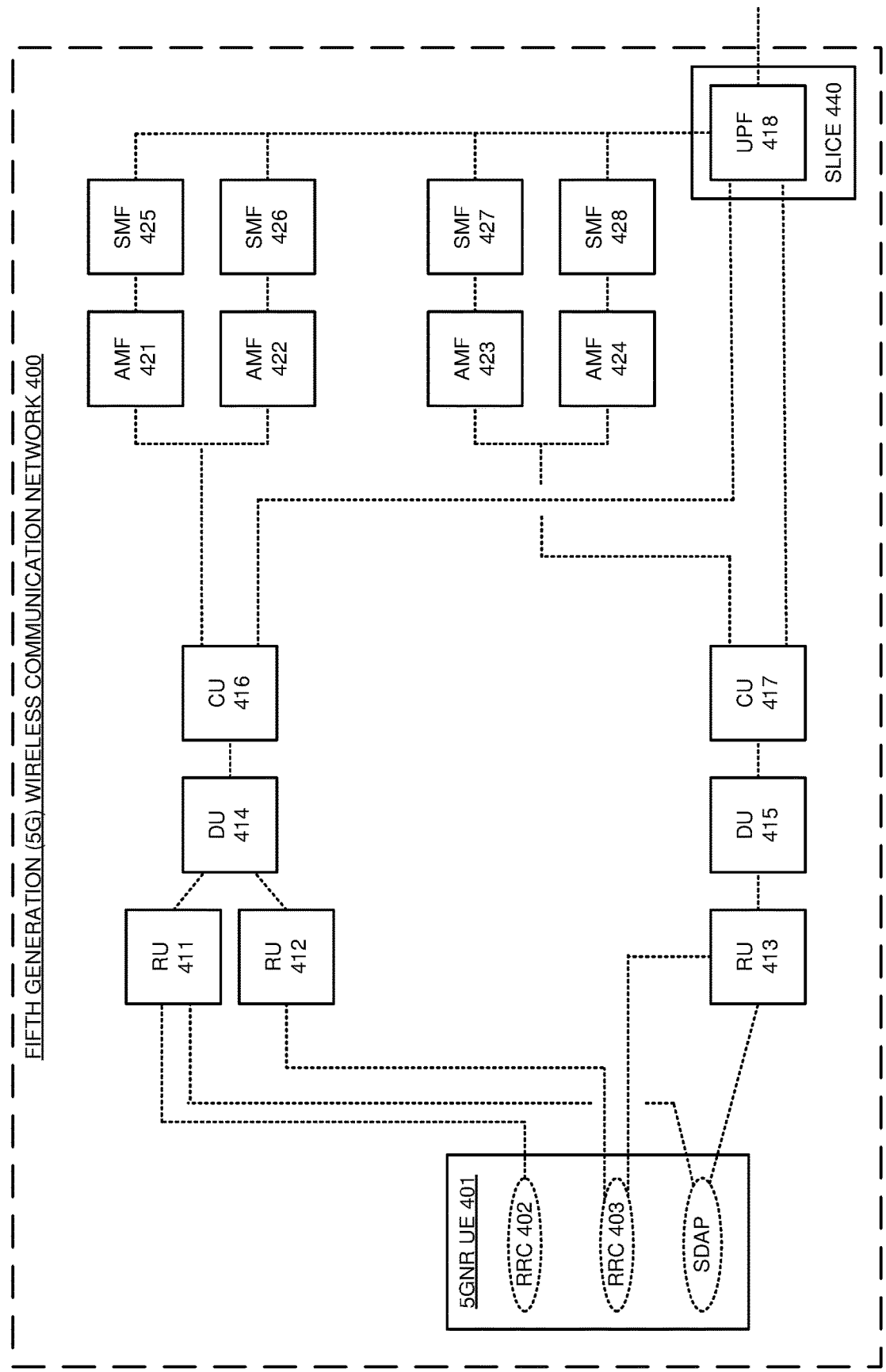
FIG. 4 illustrates a Fifth Generation (5G) wireless communication network that comprises a 5G New Radio (5GNR) UE that controls a wireless network slice that has slice requirements.

FIG. 4 illustrates Fifth Generation (5G) wireless communication network 400 that comprises 5G New Radio (5GNR) UE 401 that controls a wireless network slice type that has slice requirements. 5G wireless communication network 400 comprises an example of wireless communication network 100, although network 100 may vary from this example. 5G wireless communication network 400 comprises: UE 401, Radio Units (RUs 411-413) Distributed Units (DUs) 414-415, Centralized Units (CUs) 416-417, User Plane Function (UPF) 418, AMFs 421-424, and Session Management Functions (SMFs) 425-428. UPF 418 is part of wireless network slice 440 that has slice requirements. For example, UPF 418 may serve ultra-low-latency communications for an augmented reality slice. UE 401 comprises Radio Resource Control circuitry (RRC) 402-403 and Service Data Adaption Protocol circuitry (SDAP).

Initially, RRC 402 attaches to CU 416 over a first frequency band, RU 411, and DU 414—perhaps based on signal strength. CU 416 selects AMF 421 based on UE location and registers RRC 402 with AMF 421. AMF 421 and RRC 402 exchange data to authenticate UE 401 and establish an N1 link. RRC 402 reports UE capabilities for frequency bands and slices over the N1—including a request for the slice type of slice 440. AMF 421 authorizes UE 401 for wireless network slice 440, and in response, signals SMF 425 to control wireless network slice 440. SMF 425 selects and signals UPF 418 to serve SDAP 404 over RU 411, DU 414, and CU 416. AMF 421 signals CU 416 to serve UE 401, and CU 416 signals RRC 402 to use wireless network slice 440. An SDAP and UPF 418 exchange user data for wireless network slice 440 over the first frequency band, RU 411, DU 414, and CU 416. UPF 418 may exchange the user data with external systems.

In response to authorizing UE 401 for wireless network slice 440, AMF 421 directs RRC 402 to probe for a better AMF to control wireless network slice 440. AMF 421 transfers authentication tokens for the AMF probe to RRC 402. RRC 402 directs RRC 403 to probe for the AMF for slice 440 using the authentication tokens. RRC 403 translates UE location into a set of frequency bands. Over a second frequency band, RRC 403 attaches to CU 416 over RU 412 and DU 414 and requests an AMF for the slice type using an authentication token. CU 416 selects AMF 422 based on the UE location, slice type, and previous selection of AMF 421. CU 416 registers RRC 403 with AMF 422 using the authentication token. AMF 422 authenticates UE 401 based on the token. For example, AMF 421 may digitally sign the token with a private key and AMF 422 may verify the digital signature with a public key. AMF 422 and RRC 403 exchange data to establish an N1 link. RRC 403 requests AMF characteristics from AMF 422—particularly the AMF characteristics that correspond to the slice requirements for slice 440. AMF 422 transfers the requested AMF characteristics to RRC 403 over the N1 link. RRC 403 deregisters from AMF 422.

Over a third one of the frequency bands, RRC 403 attaches to CU 417 over RU 413 and DU 415 and requests an AMF for the slice type using another authentication token. CU 417 selects AMF 423 based on the UE location and slice type. CU 417 registers RRC 403 with AMF 423 using the authentication token. AMF 423 authenticates UE 401 based on the token. AMF 423 and RRC 403 exchange data to establish an N1 link. RRC 403 requests AMF characteristics from AMF 423—particularly the AMF characteristics that correspond to the slice requirements. AMF 423 transfers the requested AMF characteristics to RRC 403 over the N1 link. RRC 403 deregisters from AMF 422.

Over the same frequency band, RRC 403 re-attaches to CU 417 over RU 413 and DU 415 and requests another AMF for the slice type using another authentication token. CU 417 selects AMF 424 based on the UE location, slice type, and previous selection of AMF 423. CU 417 registers RRC 403 with AMF 424 using the authentication token which authenticates UE 401 based on the token. AMF 424 and RRC 403 exchange data to establish an N1 link. RRC 403 requests AMF characteristics—particularly the AMF characteristics that correspond to the slice requirements. AMF 424 transfers the requested AMF characteristics to RRC 403 over the N1 link. RRC 403 deregisters from AMF 424.

RRC 403 compares the AMF characteristics for AMFs 421-424 to the slice requirements for wireless network slice 440. For example, wireless network slice 440 may require enhanced handover processing to maintain a low-latency service. RRC 403 selects one of AMFs 421-424 to control wireless network slice 440 for UE 401. In this example, RRC 403 selects AMF 424 based on proximity to both UPF 418 and CU 417. RRC 403 directs RRC 402 to deregister from AMF 421.

RRC 403 attaches to CU 417 over RU 413 and DU 415 and requests AMF 424 for wireless network slice 440 using an authentication token. CU 417 selects AMF 424 based on the request and registers RRC 403 with AMF 424 using the authentication token. AMF 424 and RRC 402 exchange data to establish an N1 link. AMF 424 signals SMF 428 to control wireless network slice 440. SMF 428 signals UPF 418 to serve SDAP 404 over RU 413, DU 415, and CU 417. AMF 424 signals CU 417 to serve UE 401, and CU 417 signals RRC 402 to use wireless network slice 440. The SDAP and UPF 418 exchange user data for wireless network slice 440 over the third frequency band, RU 413, DU 415, and CU 417. UPF 418 may exchange the user data with external systems. AMF 424 controls wireless network slice 440 by signaling RRC 402, CU 417 and SMF 428.

Figure 5:
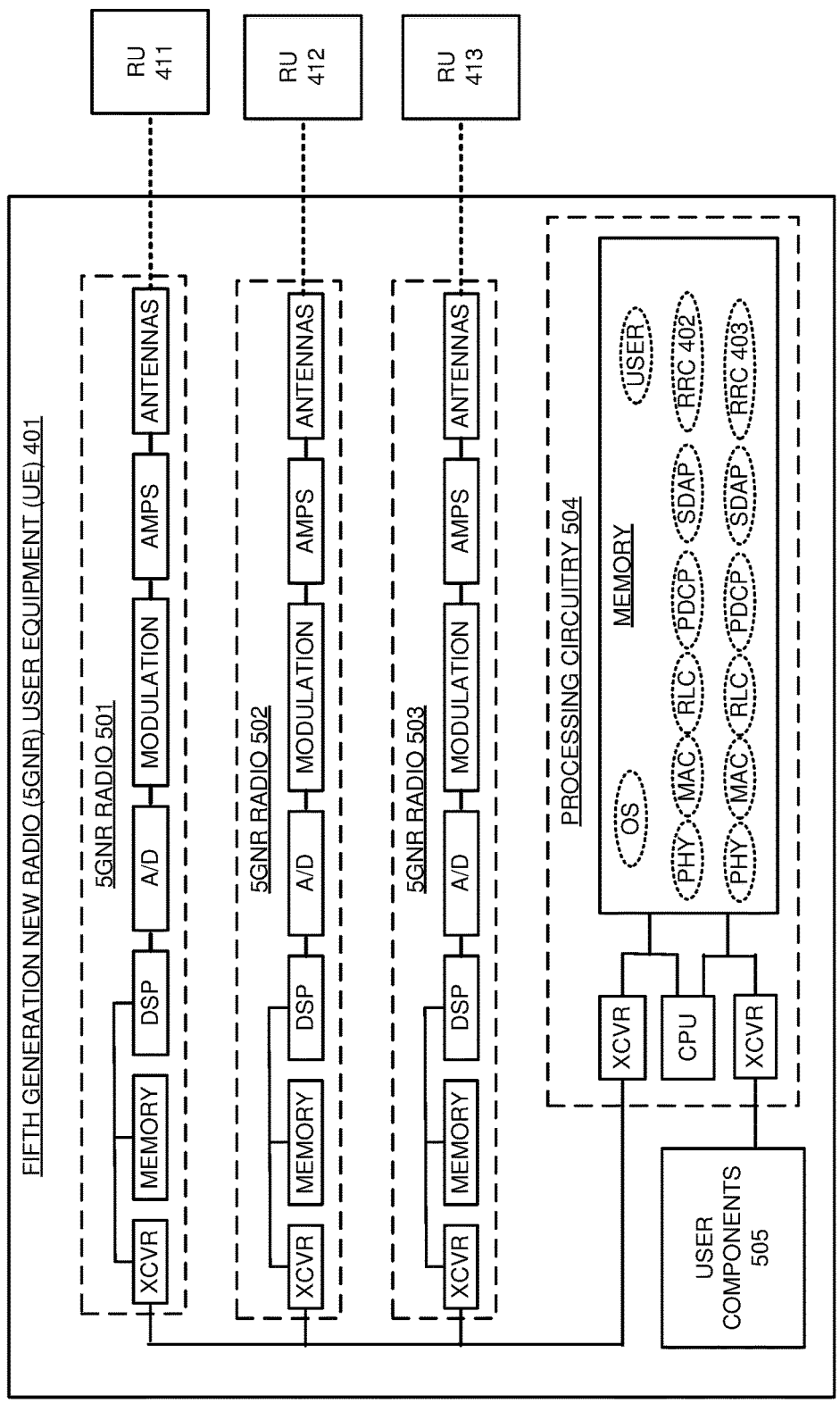
FIG. 5 illustrates the 5GNR UE in the 5G wireless communication network.

FIG. 5 illustrates 5GNR UE 401 in 5G wireless communication network 400. 5GNR UE 401 comprises an example of UE 101, although UE 101 may differ. 5GNR UE 401 comprises 5GNR radios 501-503, processing circuitry 504, and user components 505. 5GNR radios 501-503 comprise antennas, amplifiers, filters, modulation, analog-to-digital interfaces, DSP, memory, and transceivers that are coupled over bus circuitry. Processing circuitry 504 comprises memory, CPU, user interfaces and components, and transceivers that are coupled over bus circuitry. The memory in processing circuitry 504 stores an operating system, user applications (USER), and 5GNR network applications like Physical Layer (PHY), Media Access Control (MAC), Radio Link Control (RLC), Packet Data Convergence Protocol (PDCP), Service Data Adaption Protocol (SDAP), Radio Resource Control (RRC). The portion of processing circuitry 504 that stores and executes RRC 402 comprises "RRC 402 circuitry". The portion of processing circuitry that stores and executes RRC 403 comprises "RRC 403 circuitry". The portion of processing circuitry that stores and executes the SDAP comprises "user-plane circuitry". The antennas in 5GNR radios 501-503 are wirelessly coupled to RUs 411-413 over 5GNR links. Transceivers (XCVRs) in 5GNR radios 501-503 are coupled to transceivers in processing circuitry 504. Transceivers in processing circuitry 504 are coupled to user components 505 like displays, controllers, and memory. The CPU in processing circuitry 504 executes the operating system, user applications, and network applications to exchange user data over 5GNR radios 501-503.

Figure 6:
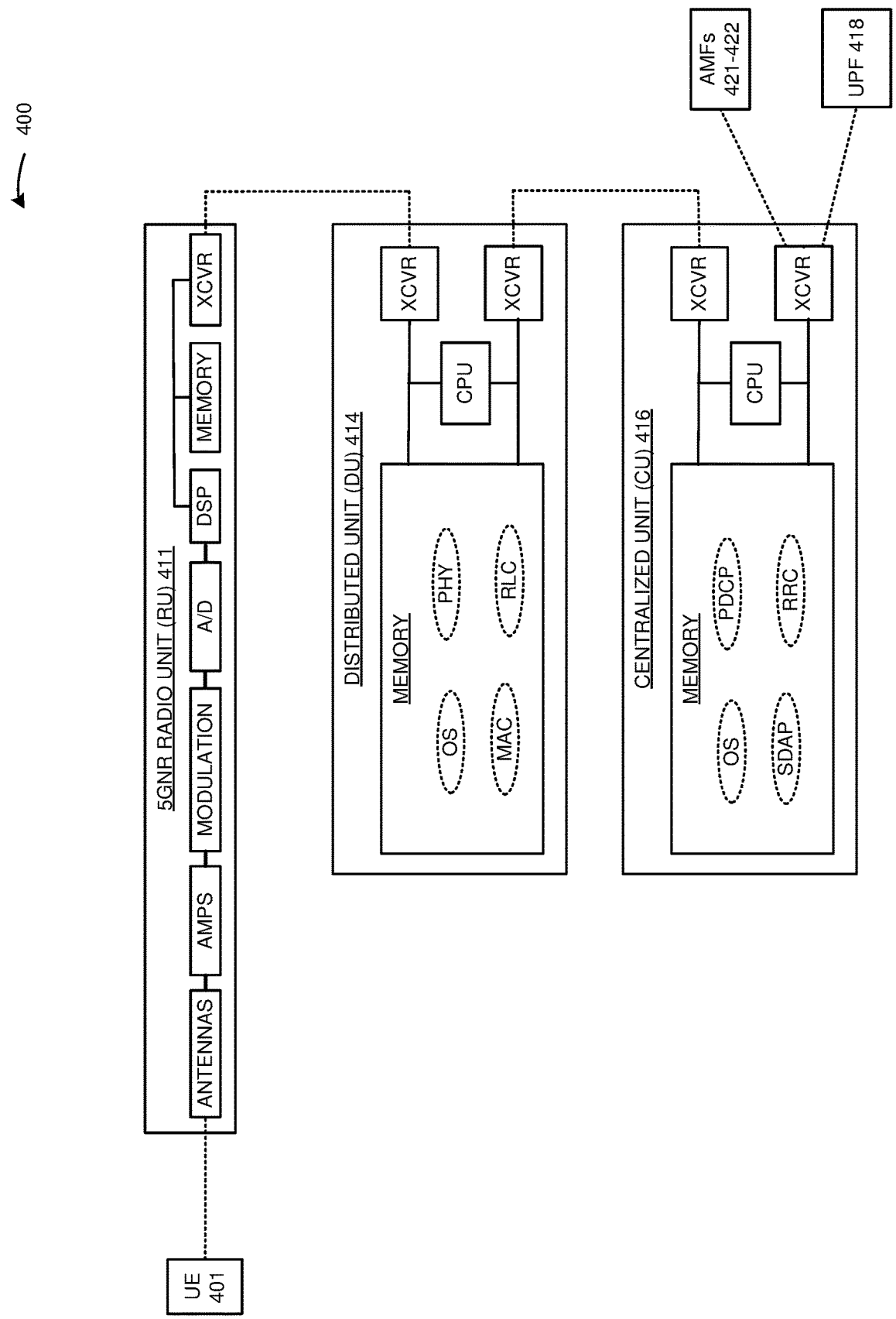
FIG. 6 illustrates a Radio Unit (RU), Distributed Unit (DU), and Centralized Unit (CU) in the 5G wireless communication network.

FIG. 6 illustrates Radio Unit (RU) 411, Distributed Unit (DU) 414, and Centralized Unit (CU) 416 in 5G wireless communication network 400. RU 411, DU 414, and CU 416 comprises an example of wireless access nodes 131-132, although nodes 131-132 may differ. RU 411, DU 414, and CU 416 also comprise examples of RUs 412-413, DU 415, and CU 417. RU 411 comprises antennas, amplifiers, filters, modulation, analog-to-digital interfaces, DSP, memory, and transceivers that are coupled over bus circuitry. DU 414 and CU 416 comprise memory, CPU, and transceivers that are coupled over bus circuitry. The memory in DU 414 and CU 415 store operating systems and 5GNR network applications. The 5GNR network applications in DU 414 include PHY, MAC, and RLC. The 5GNR network applications in CU 416 include PDCP, SDAP, and RRC. The antennas in RU 411 are wirelessly coupled to UE 401 over 5GNR links. Transceivers in RU 411 are coupled to transceivers in DU 414 over fronthaul links like enhanced Common Public Radio Interface (eCPRI). Transceivers in DU 414 coupled to transceivers in CU 416 over mid-haul links. Transceivers in CU 416 are coupled to AMFs 421-422 and UPF 418 over backhaul links. The CPU in DU 414 executes its operating system and network applications to exchange 5GNR data units with RU 411 and to exchange 5GNR data units with CU 416. The CPU in CU 416 executes its operating system and network applications to exchange the 5GNR data units with DU 414, exchange N2/N1 signaling with AMFs 421-422, and exchange N3 data with UPF 418.

Figure 7:
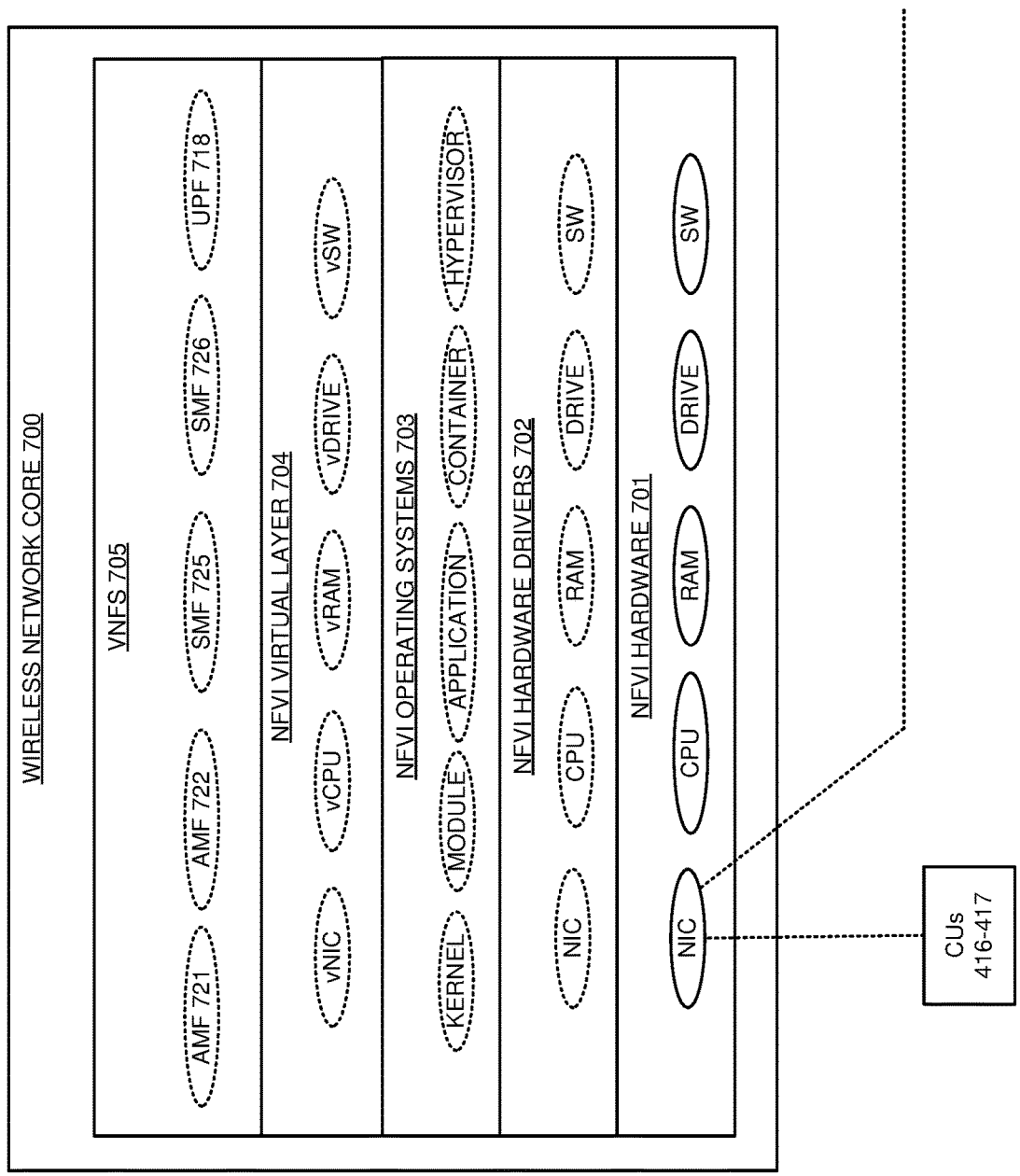
FIG. 7 illustrates a wireless network core in the 5G wireless communication network.

FIG. 7 illustrates wireless network core 700 in 5G wireless communication network 400. Wireless network core 700 comprises an example of wireless network slice 140 and AMFs 141-144, although slice 140 and AMFs 141-144 may differ. Wireless network core 700 also comprises an example of AMFs 423-424 and SMFs 427-428. Wireless network core 700 comprises Network Function Virtualization Infrastructure (NFVI) hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. NFVI VNFs 705 comprise AMFs 721-722, SMFs 725-726, and User Plane Function (UPF) 718. Other VNFs like Authentication Server Function (AUSF) and Network Repository Function (NRF) are typically present but are omitted for clarity. Wireless network core 700 may be located at a single site or be distributed across multiple geographic locations. The NIC in NFVI hardware 701 are coupled to CUs 416-417 over backhaul links. The NIC in NFVI hardware 701 are coupled to external data systems over network links. NFVI hardware 701 executes NFVI hardware drivers 702, NFVI operating systems 703, NFVI virtual layer 704, and NFVI VNFs 705 to form and operate UPF 418, AMFs 421-422, and SMFs 425-426.

Figure 8:
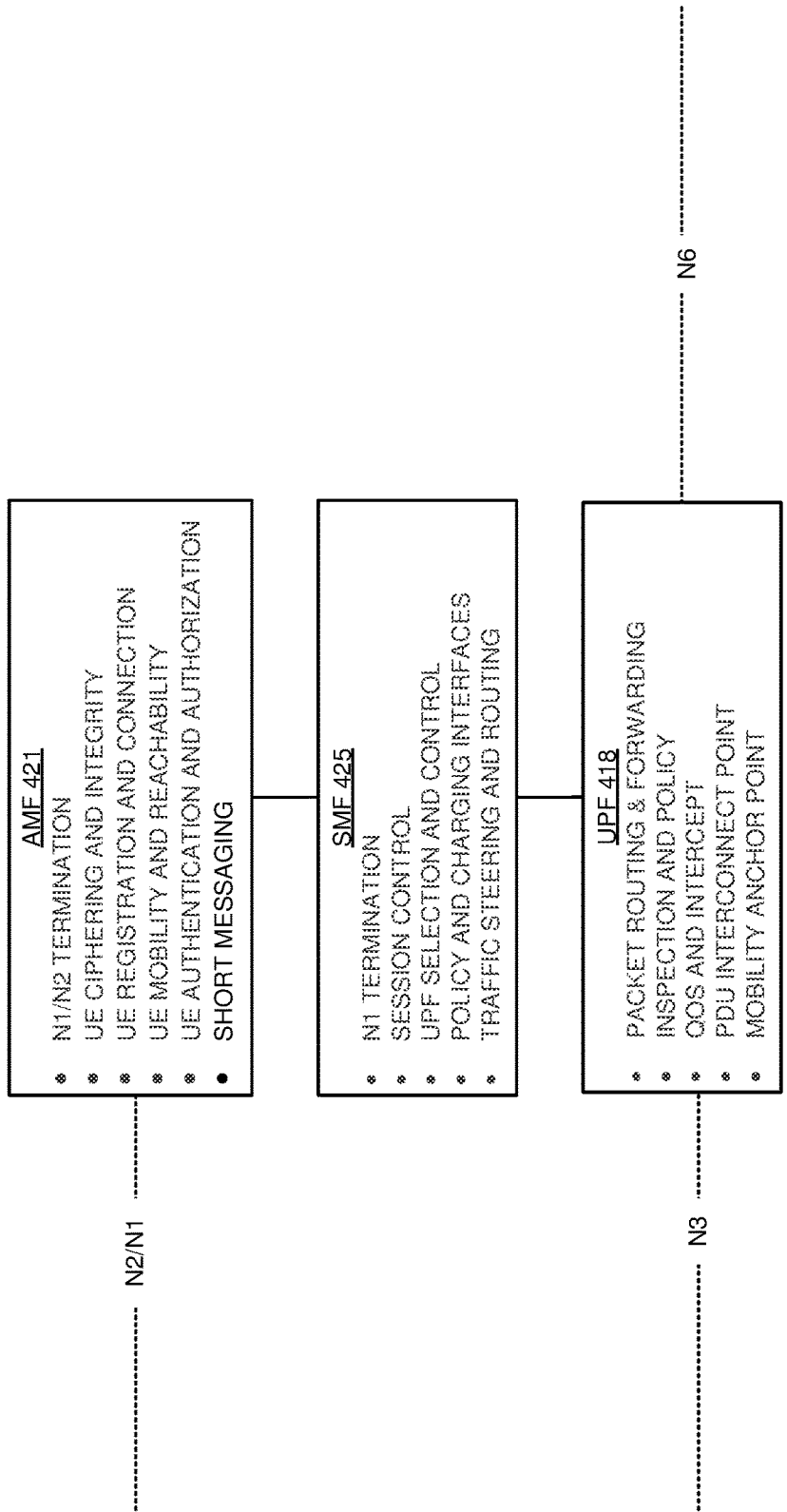
FIG. 8 further illustrates the wireless network core in the 5G wireless communication network.

FIG. 8 further illustrates wireless network core 700 in 5G wireless communication network 400. AMP 421 performs N1 termination, N2 termination, UE ciphering & integrity protection, UE registration and connection, UE mobility and reachability, UE authentication and authorization, and short messaging. SMF 425 performs N1 termination, session establishment/management, UPF selection and control, policy and charging control, and traffic steering and routing. UPF 418 performs packet routing & forwarding, packet inspection and policy, QoS handling and lawful intercept, PDU interconnection, and mobility anchoring.

Figure 9:
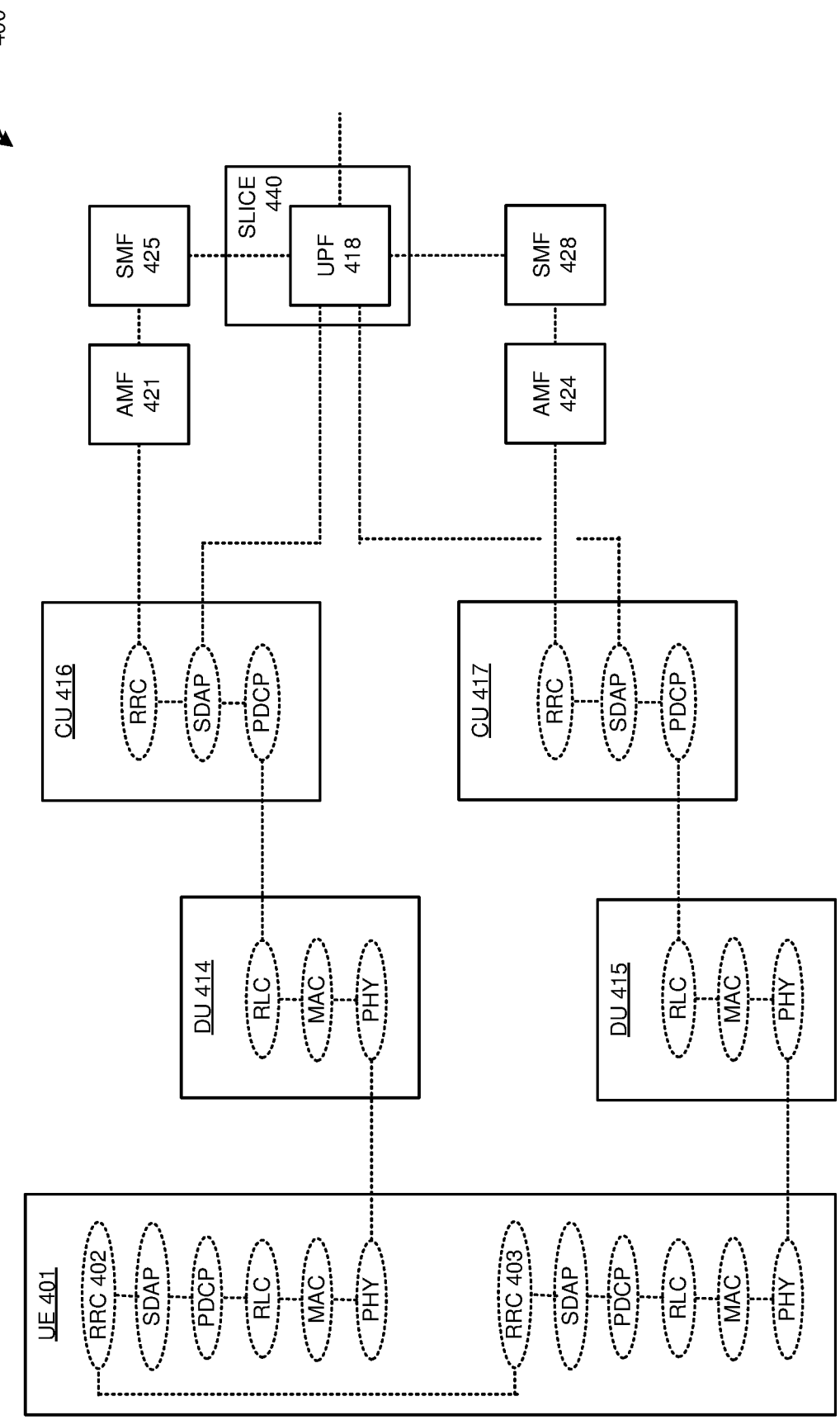
FIG. 9 illustrates an exemplary operation of the 5G wireless communication network that comprises the 5GNR UE to control the wireless network slice type that has the slice requirements.

FIG. 9 illustrates an exemplary operation of 5G wireless communication network 400 that comprises 5GNR UE 401 to control wireless network slice 440 that has a slice type and slice requirements. The operation may differ in other examples. Initially, RRC 402 attaches to the RRC in CU 416 over DU 414. The RRC in CU 416 selects AMF 421 based on UE location and registers RRC 402 with AMF 421. AMF 421 and RRC 402 exchange data to authenticate UE 401 and establish an N1 link over DU 414 and CU 416. RRC 402 reports UE capabilities for frequency bands and slice 440 over the N1. AMF 421 authorizes UE 401 for wireless network slice 440, and in response, signals SMF 425 to control wireless network slice 440. SMF 425 selects and signals UPF 418 to serve an SDAP in UE 401 over DU 414 and CU 416. AMF 421 signals the RRC in CU 416 to serve UE 401, and the RRC in CU 416 signals RRC 402 to use wireless network slice 440. The SDAP in UE 401 and UPF 418 exchange user data for wireless network slice 440 over DU 414 (PHY, MAC, RLC) and CU 416 (PDCP, SDAP). UPF 418 may exchange the user data with external systems.

In response to authorizing UE 401 for wireless network slice 440, AMF 421 directs RRC 402 to probe for a better AMF to control wireless network slice 440. AMF 421 transfers authentication tokens for the AMF probe to RRC 402. RRC 402 directs RRC 403 to probe for the AMF for slice 440 using the authentication tokens. RRC 403 translates the current UE location into a set of frequency bands. Over one of the frequency bands, RRC 403 attaches to the RRC in CU 417 over DU 415. RRC 403 requests an AMF for the slice type from the RRC using an authentication token. The RRC in CU 416 selects AMF 424 based on the UE location, slice type, and de-selection of AMF 421. CU 417 registers RRC 403 with AMF 424 using the authentication token. AMF 424 authenticates UE 401 based on the token. AMF 424 and RRC 403 exchange data to establish an N1 link over DU 415 (PHY, MAC, RLC) and CU 417 (PDCP, RRC). RRC 403 requests AMF characteristics— particularly the AMF characteristics that correspond to the slice requirements of slice 440. AMF 424 transfers the requested AMF characteristics to RRC 403 over the N1 link. RRC 403 obtains AMF characteristics for AMFs 422-423 in a similar manner.

RRC 403 compares the AMF characteristics for AMFs 421-424 to the slice requirements for wireless network slice 440. RRC 403 selects one of AMFs 421-424 to control wireless network slice 440 for UE 401. In this example, RRC 403 selects AMF 424 and signals RRC 402 to deregister from AMF 421. RRC 403 signals AMF 424 to control network slice 440 for UE 402, and in response AMF 424 signals SMF 428 to control wireless network slice 440 for UE 401. SMF 428 signals UPF 418 to serve the SDAP in UE 401 over DU 415 and CU 417. AMF 424 signals the RRC in CU 417 to serve UE 401, and the RRC in CU 417 signals RRC 403 to use wireless network slice 440. The SDAP in UE 401 and UPF 418 exchange user data for wireless network slice 440 over DU 415 (PHY, MAC, RLC) and CU 417 (PDCP, SDAP). UPF 418 may exchange the user data with external systems. AMF 424 controls wireless network slice 440 for UE 401 by signaling RRC 403, the RRC in CU 417, and SMF 428.

The wireless data network circuitry described above comprises computer hardware and software that form special-purpose user circuitry to control wireless network slice types based on slice requirements. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose user circuitry to control wireless network slice types based on slice requirements.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless User Equipment (UE) to control a wireless network slice type that has slice requirements, the method comprising:
   source Radio Resource Control (RRC) circuitry exchanging source signaling with a source Access and Mobility Management Function (AMF);
   during the exchange of the source signaling, target RRC circuitry exchanging target signaling with target AMFs, determining AMF characteristics for the target AMFs responsive to the target network signaling, comparing the AMF characteristics to the slice requirements, and selecting one of the target AMFs based on the comparison;
   at least one of the source RRC circuitry and the target RRC circuitry exchanging additional target signaling with the selected one of the target AMFs to use the wireless network slice type; and
   user-plane circuitry exchanging user data with a wireless network slice that comprises the wireless network slice type and that is controlled by the selected one of the target AMFs.

2. The method of claim 1 wherein:
   the source RRC circuitry exchanging the source signaling with the source AMF comprises exchanging the source signaling over a source N1 signaling link; and
   the target RRC circuitry exchanging the target signaling with the target AMFs comprises exchanging the target signaling over a target N1 signaling link.

3. The method of claim 1 wherein the at least one of the source RRC circuitry and the target RRC circuitry exchanging the additional target signaling with the selected one of the target AMFs comprises the target RRC circuitry exchanging the additional target signaling with the selected one of the target AMFs.

4. The method of claim 1 wherein the at least one of the source RRC circuitry and the target RRC circuitry exchanging the additional target signaling with the selected one of the target AMFs comprises the target RRC circuitry exchanging network signaling with the source RRC circuitry and the source RRC circuitry exchanging the additional target signaling with the selected one of the target AMFs.

5. The method of claim 1 wherein the source RRC circuitry exchanging the source signaling with the source AMF and the target RRC circuitry exchanging the target signaling with the target AMFs comprises the source RRC circuitry and the target RRC circuitry using a same radio.

6. The method of claim 1 wherein the source RRC circuitry exchanging the source signaling with the source AMF and the target RRC circuitry exchanging the target signaling with the target AMFs comprises the source RRC circuitry and the target RRC circuitry using a same frequency band.

7. The method of claim 1 wherein the source RRC circuitry exchanging the source signaling with the source AMF and the target RRC circuitry exchanging the target signaling with the target AMFs comprises the source RRC circuitry and the target RRC circuitry using a same wireless access node.

8. The method of claim 1 wherein the target RRC circuitry exchanging the target signaling with target AMFs and determining the AMF characteristics for the target AMFs comprises exchanging the target signaling with target AMFs and determining the AMF characteristics in response to the source RRC circuitry exchanging the source signaling with the source AMF.

9. The method of claim 1 wherein the target RRC circuitry comparing the AMF characteristics to the slice requirements and selecting the one of the target AMFs based on the comparison comprises comparing the AMF characteristics to the slice requirements and selecting the one of the target AMFs in response to a loss of received signal strength.

10. The method of claim 1 wherein:
    the source RRC circuitry exchanging the source signaling with the source AMF comprises authenticating the wireless UE with the source AMF and receiving an authentication token from the source AMF; and
    the target RRC circuitry exchanging the target signaling with target AMFs comprises transferring the authentication token to the target AMF that authenticates the wireless UE based on the authentication token.

11. A wireless User Equipment (UE) to control a wireless network slice type that has slice requirements, the wireless UE comprising:
    source Radio Resource Control (RRC) circuitry configured to exchange source signaling with a source Access and Mobility Management Function (AMF);
    during the exchange of the source signaling, target RRC circuitry configured to exchange target signaling with target AMFs, determine AMF characteristics for the target AMFs responsive to the target network signaling, compare the AMF characteristics to the slice requirements, and select one of the target AMFs based on the comparison;
    at least one of the source RRC circuitry and the target RRC circuitry configured to exchange additional target signaling with the selected one of the target AMFs to use the wireless network slice type; and
    user-plane circuitry configured to exchange user data with a wireless network slice that comprises the wireless network slice type and that is controlled by the selected one of the target AMFs.

12. The wireless UE of claim 11 wherein:
    the source RRC circuitry is configured to exchange the source signaling over a source N1 signaling link; and
    the target RRC circuitry is configured to exchange the target signaling over a target N1 signaling link.

13. The wireless UE of claim 11 wherein the at least one of the source RRC circuitry and the target RRC circuitry configured to exchange the additional target signaling with the selected one of the target AMFs comprises the target RRC circuitry configured to exchange the additional target signaling with the selected one of the target AMFs.

14. The wireless UE of claim 11 wherein the at least one of the source RRC circuitry and the target RRC circuitry configured to exchange the additional target signaling with the selected one of the target AMFs comprises the target RRC circuitry configured to exchange network signaling with the source RRC circuitry and the source RRC circuitry configured to exchange the additional target signaling with the selected one of the target AMFs.

15. The wireless UE of claim 11 wherein the source RRC circuitry and the target RRC circuitry are configured to use a same radio.

16. The wireless UE of claim 11 wherein the source RRC circuitry and the target RRC circuitry are configured to use a same frequency band.

17. The wireless UE of claim 11 wherein the source RRC circuitry and the target RRC circuitry are configured to use a same wireless access node.

18. The wireless UE of claim 11 wherein the target RRC circuitry is configured to exchange the target signaling with target AMFs and determine the AMF characteristics for the target AMFs in response to the source RRC circuitry exchanging the source signaling with the source AMF.

19. The wireless UE of claim 11 wherein the target RRC circuitry is configured to compare the AMF characteristics to the slice requirements and select the one of the target AMFs based on the comparison in response to a loss of received signal strength.

20. The wireless UE of claim 11 wherein:

the source RRC circuitry is configured to authenticate the wireless UE with the source AMF and receive an authentication token from the source AMF; and the target RRC circuitry is configured to transfer the authentication token to the target AMF that authenticates the wireless UE based on the authentication token.

\* \* \* \* \*